United States Patent Office 3,472,884
Patented Oct. 14, 1969

3,472,884
NOVEL PROCESS FOR PREPARATION OF 11-SUBSTITUTED Δ⁴,⁹-GONADIENE-3-ONES
Daniel Bertin, Montrouge, Andre Pierdet, Noisy-le-Sec, Lucien Nedelec, Clichy-sous-Bois, and Jean-Claude Gasc, Bondy, France, assignors to Roussel UCLAF, Paris, France, a corporation of France
No Drawing. Filed Oct. 17, 1966, Ser. No. 587,001
Claims priority, application France, Oct. 22, 1965, 35,958; Mar. 1, 1966, 51,506; Apr. 19, 1966, 58,177; Apr. 20, 1966, 58,340; June 1, 1966, 63,697; July 12, 1966, 69,128
Int. Cl. C07c *167/34, 167/30, 169/10*
U.S. Cl. 260—397.45        7 Claims

ABSTRACT OF THE DISCLOSURE

Process for the preparation of 11-substituted steroids of the formula

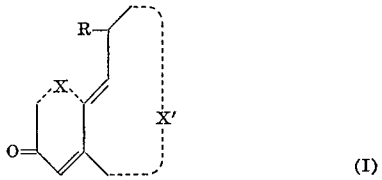

wherein R is selected from the group consisting of lower alkoxy, aralkoxy, —SH, lower alkylthio, aralkylthio and azido, X is the remainder of the A ring of the steroid molecule which may be substituted, and X' is the remainder of B, C and D rings of the steroid molecule which may be substituted. The compounds produced possess hypochloesterolemiant as well as estrogenic activity.

The 11-hydroxy group in the steroid molecule is known to be relatively inactive because of steric hindrance, but it has been possible to esterify the 11-hydroxy group under certain, well-defined reaction conditions and with energetic acylating agents. However, until recently, ethers of the 11-hydroxy group which remain inert under the classic etherification conditions were not known. The same is true with thiol, thioether and azido groups in the 11-position.

OBJECTS OF THE INVENTION

It is an object of the invention to provide a novel process for the preparation of Δ⁴,⁹-steroids of the Formula I.
This and other objects and advantages of the invention will become obvious from the following detailed description.

THE INVENTION

The novel process of the invention for the preparation of 11-substituted steroids of Formula I comprises reacting a Δ⁴,⁹-gonadiene-11β-ol-3-one of the formula

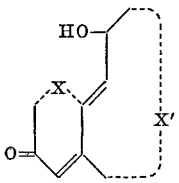

wherein X and X' have the above definition with a compound selected from the group consisting of an alcohol, a mercaptan, an alkali metal azide and hydrogen sulfide in the presence of a strong acid selected from the group consisting of inorganic oxyacids, organic acids and boron trifluoride and its complexes, in an aprotic solvent to form the corresponding steroid substituted in the 11-position with an ether, thioether, thiol or azido group.

This unexpected reaction gives a novel process for the preparation of new structures in steroid chemistry and novel steroid derivatives having interesting physiological properties. The compounds of Formula I particularly possess endocrinic and/or metabolic activities which are generally superior to 11-hydroxy steroids of the same structure. Particularly, they possess an important hypocholesterolemiant activity as well as estrogenic activity and an inhibitory activity on hypophysial gonadotrophines.

Examples of suitable strong acids for the process of the invention are inorganic oxyacids such as perchloric acid, sulfuric acid, phosphoric acid, etc.; organic acids such as p-toluene sulfonic acid, etc.; and boron trifluoride and complexes thereof. The use of hydrochloric acid which leads mainly to aromatization of the A ring is avoided. The acid is used in small quantities.

Examples of suitable reactants for the process of the invention are lower alkanols of 1 to 7 carbon atoms such as methanol, ethanol, isopropanol, propanol, butanol, tert.-butanol, etc.; aralkyl alcohols such as benzyl alcohol, β-phenyl-ethanol, etc.; alkyl mercaptans of 1 to 7 carbon atoms such as methyl mercaptan, ethyl mercaptan, propyl mercaptan, n-butyl mercaptan, tert.-butyl mercaptan, etc.; hydrogen sulfide; and alkali metal azides such as sodium azide, etc. The said reactants can be used in amounts of 1 to 25 moles of said reactant per mole of the starting 11-hydroxy steroid.

Examples of suitable aprotic solvents for the process are halogenated carbons, such as methylene chloride, chloroform, carbon tetrachloride, etc., aliphatic and cycloaliphatic hydrocarbons such as n-hexane, cyclohexane, etc.; aromatic hydrocarbons such as benzene, toluene, etc.; alkyl ethers such as ethyl ether, etc.; cyclic ethers such as dioxane, tetrahydrofuran, etc.; low molecular weight organic carboxylic acid esters such as ethyl acetate, etc.

The reaction is preferably conducted about room temperature although temperatures from 10 to 30° C. may be used. The reaction takes place very rapidly, being practically instantaneous, so that the reaction is completed at the end of a few minutes. The products can be isolated by adding water to the reaction mixture, decanting off the organic phase and evaporating the organic phase to dryness followed by purification by means such as chromatography.

Examples of the starting 11-hydroxy steroids for the process are Δ⁴,⁹-gonadiene-11β-ol-3-ones such as are described in Belgian Patents No. 649,223 and No. 649,224, which may be substituted in various positions. Examples of specific starting materials are 17α-ethynyl-Δ⁴,⁹-estradiene-11β,17β-diol-3-one, Δ⁴,⁹-estradiene-11β,17β-diol-3-one, Δ⁴,⁹-estradiene-11β-ol-3,17-dione, 17β-benzyloxy-Δ⁴,⁹-estradiene-11β-ol-3-one, 17α-chloroethynyl-Δ⁴,⁹-estradiene-11β,17β - diol-3-one, 17α-methyl-Δ⁴,⁹-estradiene-11β,17β-diol-3-one, 17α - ethyl-Δ⁴,⁹-estradiene-11β,17β-diol-3-one, 7α-methyl-17α-ethynyl-Δ⁴,⁹-estradiene-11β,17β-diol-3-one, 13β-ethyl-17α-ethynyl-Δ⁴,⁹-gonadiene-11β,17β-diol-3-one.

Particularly preferred starting materials have the formula

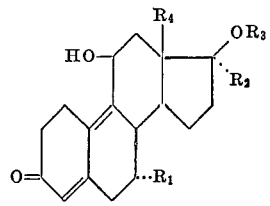

wherein R₁ is selected from the group consisting of hydrogen and lower alkyl, R₂ is selected from the group consisting of hydrogen, lower alkyl, alkynyl and haloalkynyl, $R_3$ is selected from the group consisting of hydrogen and an acyl radical of an organic carboxylic acid of 1 to 18 carbon atoms and $R_4$ is lower alkyl, particularly 1 to 4 carbon atoms, such as methyl, ethyl, propyl and butyl.

In the following examples, there are described several preferred embodiments to illustrate the invention. However, it should be understood that the invention is not intended to be limited to the specific embodiments.

EXAMPLE I

Preparation of 11β-methoxy-17α-ethynyl-$\Delta^{4,9}$-estradiene-17β-ol-3-one 5 gm. of 17α-ethynyl-$\Delta^{4,9}$-estradiene-11β,17β-diol-3-one were introduced into 250 cc. of methylene chloride containing 3‰ methanol, and then 1 cc. of 65% perchloric acid was added under vigorous stirring. The agitation was continued for several minutes following the addition after which the reaction mixture was poured into an ice-water mixture. The mixture was decanted and the organic phase was washed with water, filtered and evaporated to dryness under vacuum. The residue obtained was subjected to chromatography through silica gel. The product obtained was purified by dissolution in methylene chloride, treatment with animal black filtration and evaporation to dryness. The residue was crystallized from ether to obtain 2.6 gm. of 11β-methoxy-17α-ethynyl-$\Delta^{4,9}$-estradiene-17β-ol-3-one having a melting point of 162–163° C. and a specific rotation of $[\alpha]_D^{20} = -93.5°$ (c.=1.1% of methanol).

Ultra-violet spectra in ethanol $\lambda_{max.}$ 210mµ $E_{1\,cm.}^{1\%} = 167$ $\lambda_{max.}$ 233mµ $E_{1\,cm.}^{1\%} = 140$ $\lambda_{max.}$ 293mµ $E_{1\,cm.}^{1\%} = 628$

*Analysis.*—$C_{21}H_{26}O_3$; molecular weight=326.42. Calculated: C, 77.27%; H, 8.03%. Found: C, 77.3%; H, 8.0%.

The product occurred in the form of stable crystalline needles which were insoluble in water and soluble in most of the usual organic solvents.

An identical product was obtained with similar yields when, in the said process, the methylene chloride was replaced by cyclohexane, benzene, ether, carbon tetrachloride or chloroform.

This compound is not described in the literature.

EXAMPLE II

Preparation of 11β-ethoxy-17α-ethynyl-$\Delta^{4,9}$-estradiene-17β-ol-3-one 1 gm. of 17α-ethynyl-$\Delta^{4,9}$-estradiene-11β,17β-diol-3-one was dissolved in 50 cc. of chloroform containing 1% ethanol and then 0.2 cc. of 65% perchloric acid was added, and the reaction mixture was agitated for several minutes at room temperature. The reaction mixture was poured into ice water and the organic phase was decanted. The aqueous phase was re-extracted with chloroform, and the organic solutions were combined and washed with water, dried and finally evaporated to dryness. The residue obtained was purified by chromatography through silica gel. Then, the residue was dissolved in hot ethanol, treated with animal black, filtered, condensed to a small volume and iced. After vacuum filtering and drying, 343 mg. of 11β-ethoxy - 17α - ethynyl - $\Delta^{4,9}$ - estradiene-17β-ol-3-one having a melting point of 100–110° C. were obtained.

The product occurred in the form of small colorless rods which were insoluble in water and soluble in ethanol and chloroform.

*Analysis.*—$C_{22}H_{28}O_3$; molecular weight=340.44. Calculated: C, 77.61%; H, 8.29%. Found: C, 77.4%; H, 8.3%.

This compound is not described in the literature.

EXAMPLE III

Preparation of 11β-isopropyloxy-17α-ethynyl-$\Delta^{4,9}$-estradiene 17β-ol-3-one 3 gm. of 17α-ethynyl-$\Delta^{4,9}$-estradiene-11β,17β-diol-3-one were dissolved in 150 cc. of pure methylene chloride, (free of methanol), and first 1.8 cc. of isopropylic alcohol and then 0.8 cc. of 50% sulfuric acid were added thereto. The reaction mixture was agitated for 5 minutes and then poured into an ice-water mixture and the product formed was isolated as described in Example I to obtain 1.8 gm. of 11β-isopropyloxy-17α-ethynyl-$\Delta^{4,9}$-estradiene-17β-ol-3-one.

This compound is not described in the literature.

EXAMPLE IV

Preparation of 11β-benzyloxy-17α-ethynyl-$\Delta^{4,9}$-estradiene-17β-ol-3-one 100 mg. of 17α-ethynyl-$\Delta^{4,9}$-estradiene-11β,17β-diol-3-one were placed in suspension in 5 cc. of carbon tetrachloride containing 0.07 cc. of benzyl alcohol. After 0.02 cc. of 65% perchloric acid were added, the suspension was agitated for 2 minutes at room temperature and then poured into an ice-water mixture. The product was isolated as described in Example I to obtain 44 mg. of 11β-benzyloxy-17α-ethynyl-$\Delta^{4,9}$-estradiene-17β-ol-3-one having a melting point of 169–170° C.

The compound is not described in the literature.

EXAMPLE V

Preparation of 11β-methoxy-$\Delta^{4,9}$-estradiene-17β-ol-3-one 0.5 gm. of $\Delta^{4,9}$-estradiene-11β,17β-diol-3-one were dissolved in 25 cc. of methylene chloride containing 2‰ of methanol and after 0.1 cc. of 65% perchloric acid were added thereto, the mixture was agitated for several minutes at room temperature. Then the reaction mixture was poured into ice water, washed with water until the wash waters were neutral and distilled to dryness under vacuum. The residue was crystallized from ethyl ether to obtain 0.335 gm. of 11β-methoxy-$\Delta^{4,9}$-estradiene-17β-ol-3-one, having a melting point of 145° C. The product occurred in the form of colorless needless, which were insoluble in water and dilute aqueous acids and alkalis and soluble in most of the common organic solvents.

This compound is not described in the literature.

In analogous manner, 11β-methoxy-17α-methyl-$\Delta^{4,9}$-estradiene-17β-ol-3-one was prepared starting with 17α-methyl-$\Delta^{4,9}$-estradiene-11β,17β-diol-3-one.

This compound is not described in the literature.

In an analogous manner as well, 11β-ethoxy $\Delta^{4,9}$-estradiene 17β-ol-3-one (M.P.=128° C.) was prepared starting with $\Delta^{4,9}$-estradiene 11β,17β-diol 3- one.

This compound is not described in the literature.

EXAMPLE VI

Preparation of 11β-methoxy-$\Delta^{4,9}$-estradiene-3,17-dione

At room temperature, 0.5 gm. of $\Delta^{4,9}$-estradiene-11β-ol-3,17-dione was dissolved in 25 cc. of methylene chloride containing 2‰ of methanol and after 5 mg. of paratoluene sulfonic acid were added, the reaction mixture was agitated for several minutes. Then the reaction mixture was poured into ice water, washed with water until the wash waters were neutral and distilled to dryness under vacuum. The residue obtained was crystallized from ethyl ether to obtain 0.46 gm. of 11β-methoxy-$\Delta^{4,9}$-estradiene-3,17-dione having a melting point of 140° C.

The product occurred in the form of prisms which were insoluble in water and in dilute aqueous acids and alkalis and soluble in most of the usual organic solvents.

This compound is not described in the literature.

In an analogous manner, but using ethanol in place of methanol, 11β-ethoxy-$\Delta^{4,9}$-estradiene-3,17-diol was prepared starting with $\Delta^{4,9}$-estradiene-11β-ol-3,17-dione.

This compound is not described in the literature.

EXAMPLE VII

Preparation of 11β-methylthio-17α-ethynyl-Δ$^{4,9}$-estradiene-17β-ol-3-one 10 gm. of 17α-ethynyl-Δ$^{4,9}$-estradiene-11β,17β-diol-3-one were dissolved in 800 cc. of methylene chloride containing 10 cc. of methyl mercaptan and then 5 cc. of 32% perchloric acid were added thereto. After agitating the mixture for a few minutes at room temperature, an equal volume of water was added. The organic phase was separated, washed with water, dried and brought to dryness under vacuum. The product was purified by chromatography through silica gel to obtain 1.2 gm. of 11β-methylthio-17α-ethynyl-Δ$^{4,9}$-estradiene-17β-ol-3-one which was re-crystallized from isopropyl ether to obtain the product with a melting point of 136° C.

*Analysis.*—$C_{21}H_{26}O_2S$; molecular weight=342.48. Calculated: C, 73.64%; H, 7.65%; S, 9.36%. Found: C, 73.5%; H, 7.6%; S, 9.1%.

This compound is not described in the literature

In an analogous manner and starting with 17β-benzyloxy-Δ$^{4,9}$-estradiene-11β-ol-3-one; 17α-chloroethynyl-Δ$^{4,9}$-estradiene-11β,17β-diol-3-one; and 17α-ethyl-Δ$^{4,9}$-estradiene-11β,17β-diol-3-one, the corresponding 11β-methoxy, 11β-ethoxy, 11β-isopropylyloxy, 11β-benzyloxy, 11β-methylthio and other derivatives were prepared.

These compounds are not described in the literature.

EXAMPLE VIII

Preparation of 11β-thiol-17α-ethynyl-Δ$^{4,9}$-estradiene-17β-ol-3-one 3 gm. of 17α-ethynyl-Δ$^{4,9}$-estradiene-11β,17β-diol-3-one were dissolved in 30 cc. of methylene chloride containing 1.5 gm. of hydrogen sulfide per 100 cc. of solution. Then 1.5 cc. of 6% perchloric acid were added thereto and the mixture was agitated for 2 minutes at room temperature. The solution was then washed with water, dried and filtered and evaporated to dryness. The raw product was purified by chromatography through silica gel to obtain 0.600 gm. of 11β-thiol-17α-ethynyl-Δ$^{4,9}$-estradiene-17β-ol-3-one which was repeatedly crystallized from isopropyl ether. The product had a melting point of 190° C. and a specific rotation of $[\alpha]_D^{20}$=+184.5° (c.=0.5% in dioxane).

*Analysis.*—$C_{20}H_{24}O_2S$; molecular weight=328.45. Calculated: C, 73.12%; H, 7.37%. Found: C, 73.20%; H, 7.4.

This compound is not described in the literature.

EXAMPLE IX

Preparation of 11β-n-butylthio-17α-ethynyl-Δ$^{4,9}$-estradiene-17β-ol-3-one 500 mg. of 17α-ethynyl-Δ$^{4,9}$-estradiene-11β,17β-diol-3-one were dissolved in 50 cc. of methylene chloride and 1.6 cc. of n-butyl mercaptan and 0.25 cc. of 32% perchloric acid were added thereto. The solution was then agitated for 2 minutes at room temperature and then an equal volume of water was added thereto. After the agitation had ceased, the organic phase was decanted, washed with water, dried over sodium sulfate, filtered and evaporated to dryness under vacuum. The dry residue, weighing 667 mg. was purified by chromatography through silica gel to obtain 210 mg. of pure 11β-n-butylthio-17α-ethynyl-Δ$^{4,9}$-estradiene-17β-ol-3-one which upon recrystallization from isopropyl ether had a melting point of 140° C.

This compound is not described in the literature.

In an analogous manner, starting with 17α-ethynyl-Δ$^{4,9}$-estradiene-11β,17β-diol-3-one, 11β-tert.-butyloxy-17α-ethynyl-Δ$^{4,9}$-estradiene-17β-ol-3-one having a melting point of ≈100° C. was prepared.

Ultra-violet spectra (in ethanol):

| $\lambda_{max.}$ | 231–232 mμ | $E_{1\,cm.}^{1\%}$=134 |
|---|---|---|
|  | 302 mμ | $E_{1\,cm.}^{1\%}$=412 |

This compound is not described in the literature.

EXAMPLE X

Preparation of 7α-methyl-11β-methoxy-17α-ethynyl-Δ$^{4,9}$-estradiene diene-17β-ol-3-one STEP A.—PREPARATION OF 3,3-DIMETHOXY-7α-METHYL-17α-ETHYNYL-Δ$^{5(10),9(11)}$-ESTRADIENE-17β-OL 105 cc. of ammonia were cooled to −50° C. and under agitation and a current of inert gas, 1750 gm. of potassium were added thereto, after which a current of acetylene was allowed to bubble through the reaction mixture for 30 minutes. The precipitate was diluted with 28 cc. of ether, then 28 cc. of ether and 7 gm. of 3,3-dimethoxy-7α-methyl-Δ$^{5(10),9(11)}$-estradiene-17-one (prepared according to French Patent No. 1,456,779 issued Sept. 19,1966), were added while maintaining the temperature at −50° C. and the agitation and the current of inert gas. Then the reaction mixture was agitated for 4 hours at −40° C. while passing a current of acetylene therethrough. Next, 3.5 gm. of ammonium chloride were introduced into the reaction mixture, the temperature was raised to 0° C. and the ammonia was removed. Then, 30 cc. of water were added and the mixture was extracted with methylene chloride. The organic phase was washed with water until the wash waters were neutral, dried, filtered and evaporated to dryness to obtain 7.7 gm. of a raw 17α-ethanol derivative, which product was purified by chromatography through magnesium silicate and recrystallized from isopropyl ether to obtain 5.2 gm. (69% yield) of 3,3-dimethoxy-7α-methyl-17α-ethanyl-Δ$^{5(10),9(11)}$-estradiene-17β-ol in the form of a solid, colorless product having a melting point of about 130° C. The product was soluble in the usual organic solvents and insoluble in water and in dilute aqueous acids and alkalis.

Infra-red spectra:

Absence of C=O.
Presence of OH at 3590 cm.$^{-1}$.
Presence of C≡CH at 3300 cm.$^{-1}$.
Presence of 2 bands, type C=C conjugated at 1643 cm.$^{-1}$. and 1612 cm.$^{-1}$.

This compound is not described in the literature.

STEP B.—PREPARATION OF 7α-METHYL-17α-ETHYNYL-Δ$^{5(10),9(11)}$-ESTRADIENE-17β-OL-3-ONE 6.1 gm. of 3,3-dimethoxy-7α-methyl-17α-ethynyl-Δ$^{5(10),9(11)}$-estradiene-17β-ol were placed in suspension in 30 cc. of acetic acid containing 5% water and the solution was agitated for 15 minutes at room temperature under an inert atmosphere. Then 15 cc. of water were added to the solution which was again agitated for 15 minutes. Thereafter, always at room temperature and under inert atmosphere, 300 cc. of a saturated aqueous solution of sodium bicarbonate were slowly added, the solution was iced for 30 minutes and filtered. The precipitate was vacuum filtered and the filtrate was washed with water until the wash waters were neutral and then dried under vacuum to obtain 5.2 gm. of 7α-methyl-17α-ethynyl Δ$^{5(10),9(11)}$-estradiene-17β-ol-3-one having a melting point of 226°C.

This compound occurred in the form of crystallized colorless needles which were soluble in the usual organic solvents and insoluble in water and in dilute aqueous acids and alkalis.

Ultra-violet spectra (in ethanol):

| Inflection towards 237 mμ | $E_{1\,cm.}^{1\%}$=610 |
|---|---|
| $\lambda_{max.}$ at 241–242 mμ | $E_{1\,cm.}^{1\%}$=630 |
| Inflection towards 250 mμ | $E_{1\,cm.}^{1\%}$=440 |
| Inflection towards 290 mμ | $E_{1\,cm.}^{1\%}$= 4.7 |

This spectra characterizes a hetero-annular diene.

Infra-red spectra (in chloroform):

Presence of OH at 3590 cm.$^{-1}$.
Presence of C≡CH at 3300 cm. $^{-1}$.
Presence of non-conjugated ketone.

This compound is not described in the literature.

STEP C.—PREPARATION OF 7α-METHYL-17α-ETHYNYL-Δ$^{4,9}$-ESTRADIENE-11β,17β-DIOL-3-ONE (1) *Hydroperoxidation.*—1.2 gm. of 7α - methyl-17α-Δ$^{5(10),9(11)}$-estradiene-17α-ol-3-one were placed in suspension in 30 cc. of ethanol containing 1% of triethylamine and a stream of oxygen was passed through the solution for 24 hours at room temperature. Then the solution was evaporated to dryness to obtain 1.87 gm. of 7α-methyl-11-hydroperoxy-17α-ethynyl - Δ$^{4,9}$-estradiene - 17β-ol-3-one, which was utilized as such for the next step of the synthesis.

(2) *Reduction.*—The said 11-hydroxperoxide derivative was introduced into 6.5 cc. of ethanol and 0.65 cc. of triethyl phosphite were added thereto. The mixture was agitated for 1 hour at reflux and then brought to room temperature and 1.3 cc. of 30% hydrogen peroxide and 1.3 cc. of distilled water were added. The reaction mixture was again agitated for 1 hour and then 35 cc. of water were added. The reaction mixture was extracted with methylene chloride and the organic phase was washed with water, dried over sodium sulfate and evaporated to dryness. The residue was triturated in hot isopropyl ether, then cooled and filtered. The precipitate obtained was vacuum filtered, washed with water and dried to obtain 0.79 gm. of 7α-methyl-17α-ethynyl-Δ$^{4,9}$-estradiene - 11β, 17β-diol-3-one in the form of a solid product having a melting point of about 195° C. The product was slightly soluble in the usual organic solvents and insoluble in water and in dilute aqueous acids and alkalis.

Infrared spectra (in chloroform):

Presence of C≡CH at 3300 cm.$^{-1}$.
Presence of conjugated ketone.

Ultra-violet spectra (in ethanol):

| $\lambda_{max.}$ at 213–214 m$\mu$ | $E_{1 cm.}^{1\%}$=149 |
| $\lambda_{max.}$ at 234 m$\mu$ | $E_{1 cm.}^{1\%}$=141 |
| Inflection towards 239–240 m$\mu$ | $E_{1 cm.}^{1\%}$=138 |
| $\lambda_{max.}$ at 299 m$\mu$ | $E_{1 cm.}^{1\%}$=556 |

This compound is not described in the literature.

STEP D.—PREPARATION OF 7α-METHYL-11β-METHOXY-17α-ETHYNYL-Δ$^{4,9}$-ESTRADIENE-17β-OL-3-ONE 760 mg. of 7α-methyl-17α-ethynyl-Δ$^{4,9}$-estradiene-11β, 17β - diol - 3-one were dissolved in 38 cc. of methylene chloride containing 0.5% of methanol and 0.16 cc. of 32% perchloric acid. The solution was agitated for 7 minutes, then an ice-water mixture was added and the reaction mixture was made alkaline with triethylamine. The organic phase was washed with water until the wash waters were neutral, dried, filtered and evaporated to dryness. The raw product was subjected to chromatography through magnesium silicate and then recrystallized from ethyl acetate by heating and cooling to obtain 520 mg. of 7α - methyl - 11β - methoxy - 17α - ethynyl - Δ$^{4,9}$-estradiene - 17β - ol-3-one, having a melting point of 196°C.

*Analysis.*—C$_{22}$H$_{28}$O$_3$; molecular weight = 340.44. Calculated: C, 77.61%; H, 8.29% Found: C, 77.9%; H, 8.0%.

Infra-red spectra (in chloroform):
Presence of OH at 3590 cm.$^{-1}$.
Presence of C≡ at 3300 cm.$^{-1}$.
Presence of conjugated ketone.

Ultra-violet spectra (in ethanol):

$\lambda_{max}$ at 212m$\mu$ $E_{1 cm.}^{1\%}$=147

$\lambda_{max}$ at 240m$\mu$ $E_{1 cm.}^{1\%}$=139

$\lambda_{max}$ at 297–298m$\mu$ $E_{1 cm.}^{1\%}$=574

This compound is not described in the literature.

In analogous fashion, but by replacing the methanol with ethanol and with isopropanol, 7α-methyl - 11β-ethoxy - 17α - ethynyl - Δ$^{4,9}$ - estradiene - 17β-ol-3-one and 7α - methyl - 11β - isopropoxy - 17α - ethynyl - Δ$^{4,9}$-estradiene - 17β-ol-3-one, respectively were obtained.

These products are not described in the literature.

EXAMPLE XI

Preparation of 11β-azido-17α-ethynyl-Δ$^{4,9}$-estradiene-17β-ol-3-one 2 gm. of 17α - ethynyl - Δ$^{4,9}$ - estradiene-11β, 17β-diol-3-one were dissolved in 100 cc. of pure methylene chloride at room temperature. Under an atmosphere of nitrogen, 2 gm. of sodium azide were added and the mixture was agitated for 1 minute, after which 2 cc. of 65% perchloric acid were added and the mixture was again agitated for 3 minutes. The reaction mixtures was poured into 200 cc. of an ice-water mixture and the organic phase was separated, washed first with water, then with a solution of sodium bicarbonate and again with water, and finally was distilled to dryness under vacuum. The residue obtained was dissolved in 10 cc. of ether and filtered. The precipitate was vacuum filtered and washed with ether to obtain 1.40 gm. of raw product which was purified by chromatography through magnesium silicate to obtain 11β - azido - 17α - ethynyl - Δ$^{4,9}$-estradiene-17β-ol-3-one having a melting point of 152°C.

*Analysis.*—C$_{20}$H$_{23}$O$_2$N$_3$; molecular weight, 337.40. Calculated: C, 71.19%; H, 6.87%; N, 12.45%. Found: C, 71.1%; H, 7.0%; N, 12.4%.

Infra-red spectra (in chloroform):
Presence of N$_3$ at 2090 cm.$^{-1}$.
Presence of C=O at 1660 cm.$^{-1}$.
Presence of C=C at 1612 cm.$^{-1}$.
Presence of OH at 3590 cm.$^{-1}$.
Presence of C≡CH at 3300 cm.$^{-1}$.

Ultra-violet spectra (in ethanol):

$\lambda_{max}$ at 214m$\mu$ $E_{1 cm.}^{1\%}$=151

Inflection toward 228m$\mu$ $E_{1 cm.}^{1\%}$=141

$\lambda_{max}$ at 292–293m$\mu$ $E_{1 cm.}^{1\%}$=581

This compound is not described in the literature.

EXAMPLE XII

Preparation of 7α-methyl-11β-benzyloxy-17α-ethynyl-Δ$^{4,9}$-estradiene-17β-ol-3-one 5 gm. of 7α - methyl - 17α - ethynyl - Δ$^{4,9}$ - estradiene-11β, 17β-diol-3-one prepared as described in Example X and 5.2 cc. of benzyl alcohol were introduced into 250 cc. of carbon tetrachloride. 2 cc. of 32% perchloric acid were added and this mixture was agitated several minutes. Then the reaction mixture was diluted with water, the organic phase was separated by decantation, then washed with water, dried over sodium sulfate and finally evaporated to dryness. This raw product was subjected to chromatography through silica gel to obtain 7α-methyl-11β-benzyloxy-17α-ethynyl-Δ$^{4,9}$-estradiene-17β-ol-3-one.

This product is not described in the literature.

EXAMPLE XIII

Preparation of 7α-methyl-11β-thiol-17α-ethynyl-Δ$^{4,9}$-estradiene-17β-ol-3-one 4 gm. of 7α - methyl - 17α - ethynyl-Δ$^{4,9}$-estradiene-11β, 17β-diol-3-one, prepared as described in Example X, were introduced into 40 cc. of methylene chloride containing 0.60 gm. of hydrogen sulfide and 2 cc. of 65% perchloric acid were added thereto. The mixture was agitated for a few minutes at room temperature and after dilution with water, the organic phase was separated by decantation, washed with water, dried and concentrated to dryness under reduced pressure. The raw product was purified by chromatography through silica gel to obtain 7α-methyl-11β-thiol-17α-ethynyl-Δ$^{4,9}$-estradiene-17β-ol-3-one.

This product is not described in the literature.

EXAMPLE XIV

Preparation of 7α-methyl-11β-methylthio-17α-ethynyl-Δ-$^{4,9}$-estradiene-17β-ol-3-one 5 gm. of 7α - methyl-17α-ethynyl-Δ$^{4,9}$-estradiene-11β, 17β-diol-3-one prepared as described in Example X, were introduced into 400 cc. of methylene chloride containing 5 cc. of methyl mercaptan and then 2.5 cc. of 32% perchloric acid were added. The mixture was agitated several minutes at room temperature and diluted with water. The organic phase was decanted off, washed with water, dried and concentrated to dryness under reduced pressure. The raw product obtained was purified by chromatography through silica gel to obtain 7α-methyl-11β-methylthio-17α-ethynyl-Δ$^{4,9}$-estradiene-17β-ol-3-one.

This product is not described in the literature.

In an analogous fashion, by replacing methyl mercaptan with ethyl mercaptan, propyl mercaptan and butyl mercaptan, 7α - methyl-11β-ethylthio-17α-ethynyl-Δ$^{4,9}$-estradiene - 17β - ol-3-one, 7α-methyl-11β-propylthio-17α-ethynyl-Δ$^{4,9}$-estradiene - 17β - ol - 3-one and 7α-methyl-11β - butylthio-17α-ethynyl-Δ$^{4,9}$-estradiene-17β1ol-3-one, respectively, were obtained.

These products are not described in the literature.

EXAMPLE XV

Preparation of 11β-methoxy-13β-ethyl-17α-ethynyl-Δ$^{4,9}$-gonadiene-17β-ol-3-one 0.5 gm. of 13β-ethyl 17α-ethynyl-Δ$^{4,9}$-gonadiene-11β, 17β-diol-3-one were dissolved in 25 cc. of methylene chloride containing 0.15% of methanol. Then 0.1 cc. of 65% perchloric acid was added. The solution was agitated for several minutes at room temperature, then washed with water until the wash waters were neutral and evaporated to dryness in vacuum. The residue was chromatographed through silica gel, then eluted with a mixture benzene ethyl acetate. The product was purified by recrystallization from ether to obtain 0.2 gm. of 11β-methoxy-13β-ethyl - 17α - ethynyl-Δ$^{4,9}$-gonadiene-17β-ol-3-one having a melting point of 164° C. and a specific rotation $[α]_D^{20}$ =−110°±2.5 (c.=0.58%, methanol).

Ultra-violet spectra (in ethanol):

$\lambda_{max.}$ 231mμ $E_{1cm.}^{1\%}$=137

$\lambda_{max.}$ 295mμ $E_{1cm.}^{1\%}$=573

*Analysis.*—$C_{22}H_{28}O$; Molecular weight, 340.44. Calculated: C, 77.60%; H, 8.29%. Found: C, 77.5%; H, 8.6%.

The product which is not described in the literature was soluble in alcohols, acetone, benzene and chloroform.

The starting product, the 13β-ethyl-17α-ethynyl-Δ$^{4,9}$-gonadiene-11β,17β-diol-3-one (M.P. 200° C.), which is not described in the literature, may be obtained starting with 13β - ethyl - 17α-ethynyl-Δ$^{5(10),9(11)}$-gonadiene-17β-ol-3-one, described in Belgian Patent No. 663,534 and using processes described in Belgian Patents Nos. 649,-223 and 649,224, by reacting the oxygen with the 13β-ethyl - 17α-ethynyl-Δ$^{5(10),9(11)}$-gonadiene-17β-ol-3-one to obtain the 11β - hydroperoxy-13β-ethyl-17α-ethynyl-Δ$^{4,9}$-gonadiene-17β-ol-3-one which is treated with a reducing agent to give the desired compound.

Various modifications of the process of the invention may be made without departing from the spirit or scope thereof and it is to be understood that the invention is to be limited only as defined in the appended claims.

We claim:

1. A process for preparing a chemical compound having a gonane nucleus wherein the A ring has a 3-keto-Δ4-grouping, and the 9(10) position is unsaturated, said nucleus having attached hereto in the 11β-position a radical selected from the group consisting of lower alkoxy, arayl-koxy, thiol, lower alkyl thio and azido and in the 13-position a lower alkyl radical, which consists of reacting the corresponding 11β-hydroxy gonane with a compound selected from the group consisting of an alcohol, a mercaptan, an alkali metal azide, and hydrogen sulfide in the presence of a strong acid selected from the group consisting of inorganic oxyacids, organic acids and boron trifluoride and its complexes in an aprotic solvent and recovering the desired product.

2. The process of claim 1 wherein the compound reacted with the Δ$^{4,9}$-gonadiene-11β-ol-3-one is selected from the group consisting of alkanol, arylalkyl alcohol, alkyl mercaptan and aralkyl mercaptan.

3. The process of claim 1 wherein the strong acid is selected from the group consisting of perchloric acid, sulfuric acid, phosphoric acid, p-toluene sulfonic acid and boron trifluoride and its complexes.

4. The process of claim 1 wherein the reaction is effected at about ambient temperatures.

5. The process of claim 1 wherein the aprotic solvent is selected from the group consisting of halogenated hydrocarbons, aliphatic hydrocarbons, aromatic hydrocarbons, cycloaliphatic hydrocarbons, alkyl ethers, cyclic ethers and low molecular weight organic carboxylic acid esters.

6. The process of claim 1 wherein the 11β-hydroxy-gonane compound has a 7α-lower alkyl substituent.

7. The process of claim 1 wherein the starting gonane has the formula

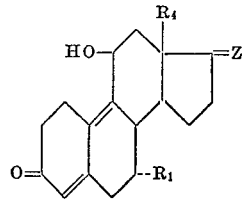

wherein $R_1$ is selected from the group consisting of hydrogen and lower alkyl; $R_4$ is lower alkyl and Z is selected from the group consisting of =O and

$R_2$ is selected from the group consisting of hydrogen, lower alkyl, lower alkynyl and chloro lower alkynyl and $R_3$ is selected from the group consisting of hydrogen and acyl of an organic carboxylic acid of 1 to 18 carbon atoms.

References Cited

UNITED STATES PATENTS 3,062,846  11/1962  Fried _____ 260—397.4

LEWIS GOTTS, Primary Examiner

ETHEL C. LOVE, Assistant Examiner

U.S. Cl. X.R.

260—349, 397.3, 397.5, 999